Dec. 28, 1937.    H. B. ALEXANDER    2,103,926
METHOD OF PRODUCING DIAZODINITROPHENOL AND PRODUCT THEREOF
Filed Aug. 8, 1936

INVENTOR
Harvey B. Alexander
BY
Busser + Harding
ATTORNEYS

Patented Dec. 28, 1937

2,103,926

UNITED STATES PATENT OFFICE 2,103,926

METHOD OF PRODUCING DIAZODINITROPHENOL AND PRODUCT THEREOF

Harvey B. Alexander, Kingston, N. Y., assignor to Hercules Powder Company, Wilmington, Del., a corporation of Delaware Application August 8, 1936, Serial No. 95,014

4 Claims. (Cl. 260—69)

This invention relates to a method for the production of diazodinitrophenol, and more particularly to a method of producing diazodinitrophenol directly in free-flowing form.

Diazodinitrophenol has been known heretofore, and methods for its production have been disclosed. For example, diazodinitrophenol and a method for its production are disclosed in United States patents to Dehn, Nos. 1,404,687, 1,428,011, and 1,460,708. The compound is a very valuable composition for use in blasting caps. However, as generally produced, it is not sandy or free-flowing, and gives great difficulty in loading blasting caps by mechanical means.

Attempts have been made to produce free-flowing diazo grains, e. g., as described in United States Patent No. Re. 19,645 to Hancock and Pritchett, but such has not been wholly satisfactory.

In accordance with my invention a novel method is provided for the production of diazodinitrophenol directly in free-flowing form, adapted to mechanical loading into blasting cap shells.

The method embodying this invention comprises diazotization of a salt of picramic acid by a salt of nitrous acid and an acid, in the presence of a substance adapted to promote the formation of rounded grains of diazodinitrophenol.

Figure 2:
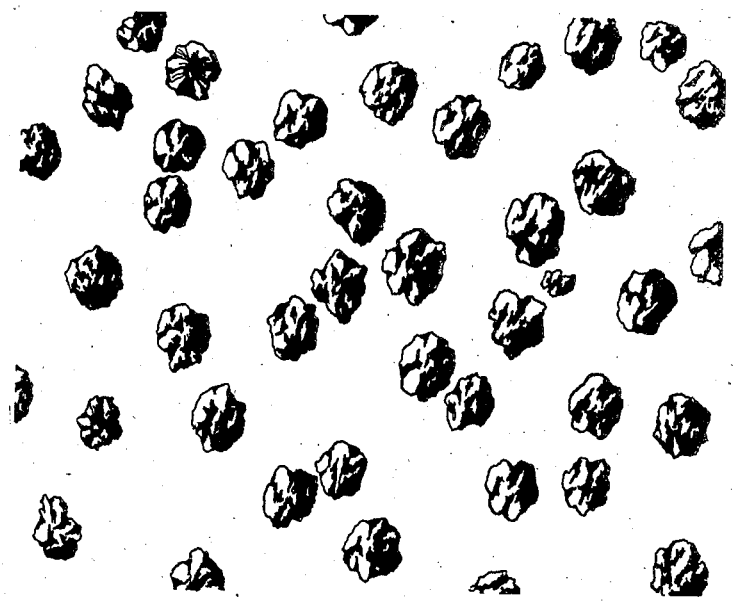
Figure 1:
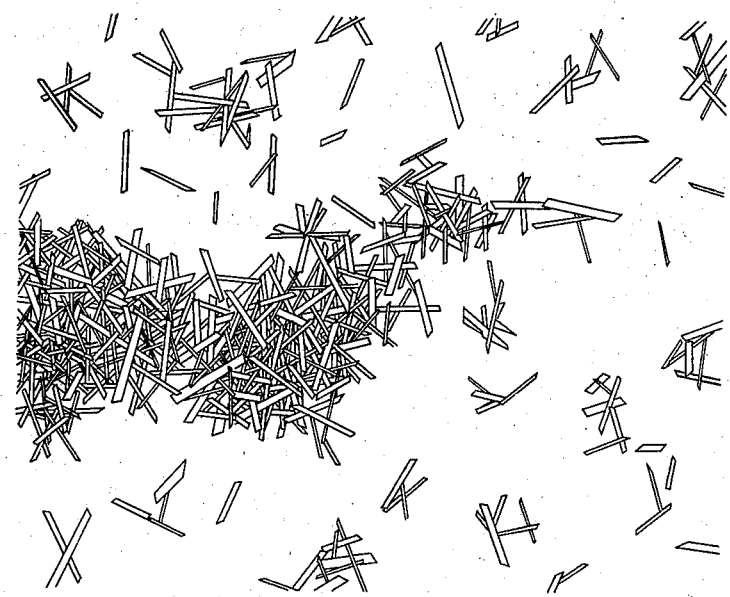

Reference is made to the accompanying drawing, in which Figure 1 represents the needle-like crystals of diazodinitrophenol produced by the known processes from relatively pure ingredients, and Figure 2 represents the rounded, free-flowing form of diazodinitrophenol produced by the method in accordance with my invention.

It will be appreciated that the needle-like crystals shown in Figure 1 of the accompanying drawing will mat and pile like a mass of straw, without flowing through holes into a measuring or loading plate, whereas crystals shown in Figure 2 of the accompanying drawing will flow freely through such holes like sand or mercury fulminate. Thus, crystals of the form shown in Figure 1 become impossible to load into blasting caps by the usual procedure.

With the use of a relatively pure salt of picramic acid, e. g., sodium picramate, a relatively pure sodium nitrite, and relatively pure sulphuric or hydrochloric acid, diazodinitrophenol is produced in the crystal form shown in Figure 1 of the accompanying drawing.

I have found, however, that when certain substances are added to the reaction mixture which produces diazodinitrophenol, rounded, sandy, free-flowing grains of diazodinitrophenol are produced in the shape shown in Figure 2 of the accompanying drawing.

I have found that addition to the reaction mixture comprising a salt of picramic acid, a soluble metal nitrite, and a strong acid, of pyrogallol, hydroquinone, phloroglucinol, catechol, resorcinol, p-methylaminophenol, 3,5-dinitrocatechol, p-aminophenol, isopicramic acid, dinitroresorcinol, o-aminophenol, p-sulfanilic acid, o-nitranilin, β-naphthol, nitrosonaphthol, methyl orange, hydroxylamine, 3,5,3',5'-tetranitro-2, 2'-dihydroxyhydrazobenzene, o-phenylenediamine, p-phenylenediamine, 2,4-diamino-6-nitrophenol, 2,4,6-trinitrobenzoic acid, 2-amino-4-nitrophenol, 2,4-dinitrophenol, trinitro-m-cresol, p-nitranilin, or a substance of unknown composition formed by decomposing diazodinitrophenol by alkali, or mother liquors from the manufacture of sodium picramate, or substances present in the mother liquors from the manufacture of sodium picramate, or a mixture of any of the above, in various amounts, depending upon the particular compound employed, produces diazodinitrophenol in the shape of rounded, free-flowing crystals of the shape shown in Figure 2 of the accompanying drawing.

I have been unable to determine any generic term or group which comprises compounds having the property of producing diazodinitrophenol in free-flowing form, under the conditions of reaction stated, particularly since I have found that certain organic substances which, by analogy, should act in the same manner, do not so act. Examples of the latter are methylene blue, 3,5,3',5'-tetranitro-2, 2'-dihydroxyazobenzene, 3,5,3',5'-tetranitro-2,2'-dihydroxyazoxybenzene, picric acid, 3,5-dinitro-benzoic acid, gum arabic, phenol, anilin, and eosin.

As illustrative of the practical application of the method in accordance with my invention, the following examples are given, all of which produce diazodinitrophenol in free-flowing form:

Example I

About 21 parts by weight of recrystallized sodium picramate and about 6.8 parts by weight of relatively pure sodium nitrite were added to about 300 parts by weight of water in a vessel having a cooling jacket, the slurry or suspension stirred and the temperature maintained at about 14.5° C. to about 15.5° C., then about 0.4 part to about 0.04 part by weight of pyrogallol in 10 parts by weight of water and one drop of an aqueous 20% caustic soda solution added, then about 50 parts by weight of 20% sulfuric acid added at the rate of about 20 drops per minute. After all the sulfuric acid is added, the diazodinitrophenol is isolated in a free-flowing form by filtration, and purified by washing with cold water.

Example II

The same method is used as in Example I, but the pyrogallol is replaced by hydroquinone, phloroglucinol, catechol, or resorcinol.

Example III

The same method is used as in Example I, except that the sodium hydroxide is omitted.

Example IV

The same method is used as in Example I, except that 0.4 part by weight of dinitroresorcinol is used in place of the pyrogallol.

Example V

About 4.2 kg. of pure, dry sodium picramate hydrate was placed in a glass-lined tank, fitted with an agitator, and about 40 liters of water added. Then about 1.4 kg. of pure sodium nitrite dissolved in 5 liters of water was run into the tank. To this slurry in the tank was then added 1.5 liters of a solution of decomposed diazodinitrophenol prepared by adding gradually over a period of 3 hours about 160 cc. of 10% sodium hydroxide to 42 g. of pure diazodinitrophenol. The slurry was then diluted with water to about 52.7 liters, and agitation started. The temperature was adjusted to about 14° C. and there maintained during the reaction. About 6.7 kg. of approximately 6 N hydrochloric acid was added at the constant rate of about 23.4 cc. per minute, so that diazotization, as shown by the starch iodide test for nitrous acid, was complete in about 275 minutes. Agitation was then stopped and the charge in the tank transferred to a suction filter, the mother liquor drawn off, and the granular diazodinitrophenol produced was washed with cold water to free it from impurities.

Example VI

The same method is used as in Example V, except that, instead of adding the decomposed diazodinitrophenol solution, 6.7 kg. of mother liquor from the manufacture of sodium picramate (by reduction of sodium picrate by sodium sulfide) was added before starting the diazotization.

Example VII

The same method is used as in Example V, except that, instead of the decomposed diazodinitrophenol, about 4.2 g. of hydroquinone was added to the slurry before starting the addition of the hydrochloric acid.

The procedures given in the above illustrations by way of example, may be varied widely without departing from this invention. Likewise, various picramates, nitrites, and acids may be used in varying proportions, and conditions of diazotization, e. g., temperature, concentrations, etc., may be varied widely within operative limits.

The method in accordance with this invention is not dependent upon the use of any particular form of apparatus, means for cooling, stirring, or the like.

What I claim and desire to protect by Letters Patent is:

1. Method of producing free-flowing diazodinitrophenol which includes reacting a salt of picramic acid, a soluble nitrite, and a strong acid in the presence of mother liquor derived from the manufactue of picramic acid.

2. Method of producing free-flowing diazodinitrophenol which includes reacting a salt of picramic acid, a soluble nitrite, and a strong acid, in the presence of a substance produced by decomposition of diazodinitrophenol by an alkali.

3. Method of producing free-flowing diazodinitrophenol which includes reacting a salt of picramic acid, a soluble nitrite, and a strong acid in the presence of mother liquor obtained from the manufacture of sodium picramate.

4. The method of producing free-flowing diazodinitrophenol which includes reacting a salt of picramic acid, a soluble nitrite and a strong acid in the presence of an added substance capable, under the conditions of diazotization, of controlling the crystallization of the diazodinitrophenol formed so as to produce rounded, free-flowing particles of diazodinitrophenol; said added substance being selected from the group consisting of pyrogallol, hydroquinone, phloroglucinol, catechol, resorcinol, p-methylaminophenol, 3,5-dinitrocatechol, p-aminophenol, isopicramic acid, dinitroresorcinol, o-aminophenol, p-sulfanilic acid, o-nitranilin, B-naphthol, nitrosonaphthol, methyl orange, hydroxylamine, 3,5,3',5' - tetranitro - 2,2' - dihydroxyhydrazobenzene, o-phenylenediamine, p-phenylenediamine, 2,4-diamino-6-nitrophenol, 2,4,6-trinitrobenzoic acid, 2-amino-4-nitrophenol, 2,4-dinitrophenol, trinitro-m-cresol, p-nitranilin, a substance of unknown composition formed by decomposing diazodinitrophenol by alkali, and a substance of unknown composition present in the mother liquors from the manufacture of sodium picramate.

HARVEY B. ALEXANDER.